United States Patent [19]

Ballman

[11] 4,223,262
[45] Sep. 16, 1980

[54] MEANS FOR CONTROLLING BATTERY CHARGERS

[76] Inventor: Gray C. Ballman, 30 Portland Dr., St. Louis, Mo. 63131

[21] Appl. No.: 914,408

[22] Filed: Jun. 12, 1978

[51] Int. Cl.³ .............................................. H02J 7/04
[52] U.S. Cl. ....................................... 320/40; 320/38
[58] Field of Search .................................. 320/22–24, 320/37, 38, 39, 40, 35

[56] References Cited

U.S. PATENT DOCUMENTS 3,652,916  3/1972  Ballman .................................. 320/35

*Primary Examiner*—Robert J. Hickey
*Attorney, Agent, or Firm*—Joseph A. Fenlon

[57] ABSTRACT

A battery charger control device which senses the placement of a battery across control terminals and utilizes the voltage thereof to place into conduction a transistor which actuates a relay which turns on a battery charger, which thereafter, monitors the the charge condition of the battery as determined by the voltage supplied to a voltage following circuit from the control terminals, and which actuates an electronic switch after the elapse of a predetermined period of time after the battery has attained a fully charged condition as determined by the voltage of the battery as presented to the voltage following circuit.

2 Claims, 1 Drawing Figure

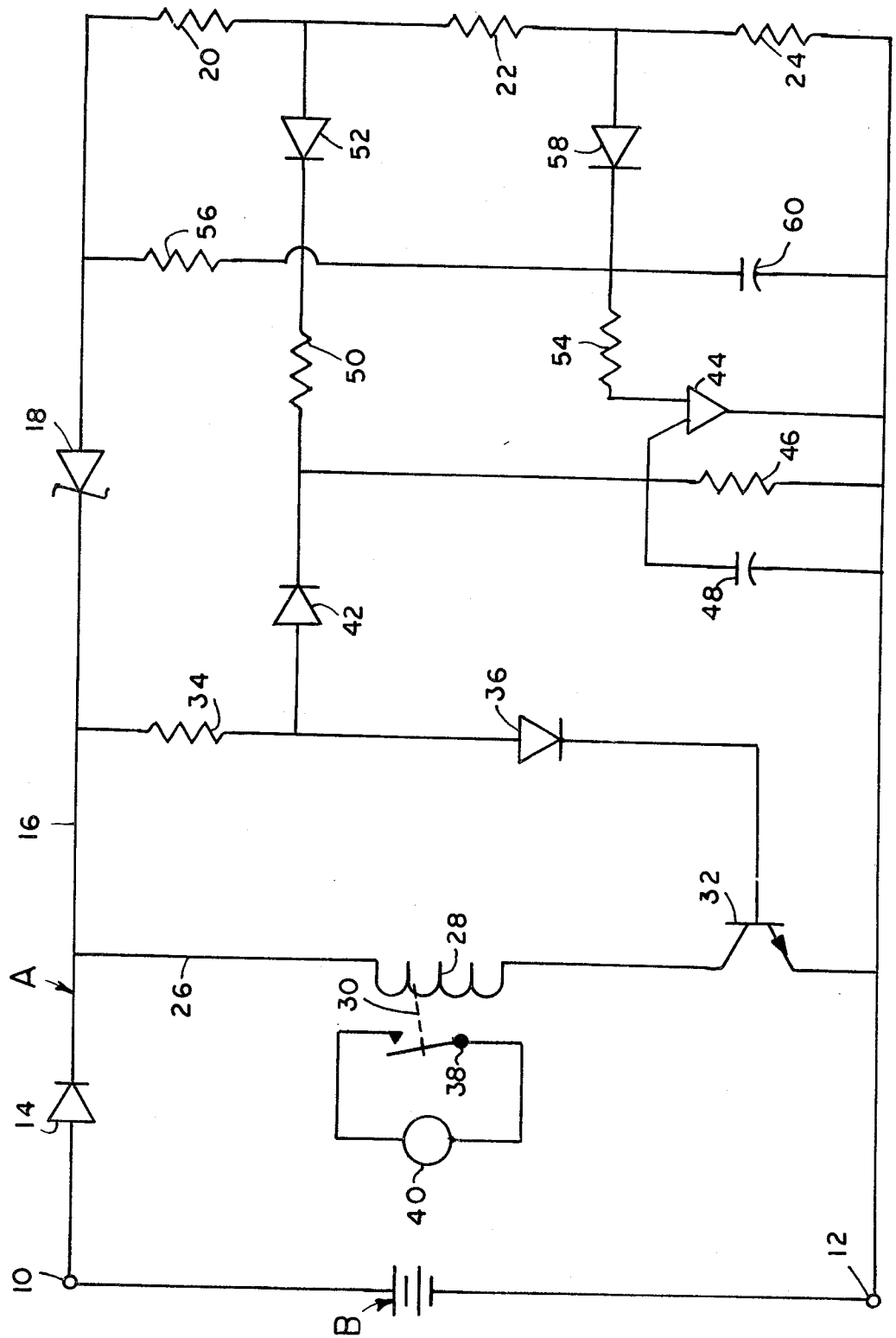

MEANS FOR CONTROLLING BATTERY CHARGERS

In battery charging, there is no one fixed voltage at which a given group of batteries achieves fully charged status. Each battery voltage at fully charged condition varies from all other similar batteries and no one voltage will satisfy all batteries of the same type. The only fact that is true of all batteries is that once batteries are fully charged, their terminal voltage will stay fixed. The ideal battery charger control, therefore, is one which senses the point at which any batteries being charged thereon develop a fixed terminal voltage and which thereafter starts the process of terminating the charging cycle.

It is the object of this invention to provide such an ideal charging control device.

Reference is hereby made to my copending application for Letters Patent, Ser. No. 825,943, filed Aug. 19, 1977.

With the above and other objects in view, which will become immediately apparent upon reading this specification, studying the accompanying drawings, and digesting the claims, this invention resides in the unique and novel form, construction, arrangement and combination of the various parts and elements described therein.

IN THE DRAWINGS

The drawing presents a schematic diagram of a voltage following control circuit which embodies my invention.

In the drawings, A represents a Voltage Following Control Device comprising a positive terminal 10 and a negative terminal 12 across which is removably connected the respective terminals of a battery B. Connected the terminals 10, 12 and separated therefrom by a blocking diode 14 is a terminal voltage following circuit 16 comprising a Zener diode 18, and three series resistors 20, 22 and 24. Connected in parallel with the voltage following circuit 16 is a relay energizing circuit 26 including the coil 28 of a relay 30, the collector of a transistor 32, and the emitter of the transistor 32. The base of the transistor 32 is connected to the cathode of the diode 14 through a resistor 34 and a second blocking diode 36. The relay 30 also includes a set of normally open contacts 38 which supply operating current to a battery charger 40 where the relay 30 is energized. Also connected to the resistor 34 through a third blocking diode 42 is the gate of an PUT 44, the cathode of which is connected to the negative terminal 12. Connected in parallel across the gate of the PUT 44 and the negative terminal 12 are a resistor 46 and a capacitor 48. The gate of the PUT 44 is also connected to the common connection of the resistors 20, 22, through a resistor 50 and a fourth blocking diode 52. The anode of the PUT 44 is connected to the common connection of the Zener 18 and the resistor 20 through two resistors, 54 and 56, in series. The common connection of the resistors 54 and 56 is connected to the common connection of the resistors 22, 24, through a fifth blocking diode 58 and is also connected to the negative terminal 12 through a capacitor 60.

The components of the circuit A are selected that when a battery B is connected across the terminals 10, 12, the voltage imposed between the base and the emitter of the transistor 32 will place transistor 32 into conduction causing energizing current to flow through the relay coil 28 energizing the relay 30 and closing the contacts 38 which causes the battery charger 40 to start charging the battery B. As long as the battery B is in a not fully charged condition the PUT 44 remains nonconducting.

The voltage following circuit 16 follows the terminal voltage of the battery B which increases as the battery charge increases. The Zener 18 reduces the battery terminal voltage by a predetermined amount and that reduced voltage is apportioned between the three series resistors 20, 22, 24, according to their respective magnitudes. The voltage at the common connection of the resistors 20 and 22 is transferred to the gate of the PUT 44 through resistor 50 and the voltage at the common connection of the resistors 22 and 24 is transferred to the anode of the PUT 44 and the capacitor 60 which develops a charge rapidly equal to that voltage. It should be here noted that the capacitor 60 also starts developing a charge independent of battery B terminal voltage through the resistor 56; however, the magnitudes of capacitor 60 and resistor 56 have been preselected to make this a comparatively long period of time with respect to the charging current from resistor 24. It should be further noted that the voltage presented to the gate of the PUT 44 depends on the respective magnitudes of resistors 50 and 46.

The characteristics of PUT 44 have been preselected so that when its anode gets at least ½ volt more positive than its gate, it will fire, which event will occur some finite time after (1) the battery B terminal voltage has exceeded the limit set by the Zener 18, and (2) the voltage at the gate of PUT 44 has stopped rising (the terminal voltage of all batteries stops rising when the battery is fully charged), and (3) the voltage at the anode of PUT 44 has been increased to a value which exceeds the gate voltage of PUT 44 by at least ½ volt by the charging of capacitor 60 through resistor 56. Once PUT 44 goes into conduction, it is held in conduction by the valley current, and transistor 32 is biased out of conduction by additional current flowing through the resistor 34, which opens the relay 30 and stops the charging of the batter B. PUT 44 remains in conduction until the battery B is removed from the terminals 10, 12, or until the terminal voltage of the battery B drops substantially below the rated voltage of Zener 18.

The following table presents a suggested component usage for a Circuit A which is adapted for use in 36 volt battery charging circuits:

| Resistors | (ohms) |
|---|---|
| 20 | 680 |
| 22 | 82 |
| 24 | 820 |
| 34 | 8.2K |
| 46 | 15M |
| 50 | 150K |
| 54 | 220 |
| 56 | 4.7M |
| Capacitors | |
| 48 | .027nf |
| 60 | 4500nf |
| Diodes | |
| 14 | 1N2069 |
| 18 | 1N4121 (Zener, 330) |
| 36 | 1N2069 |
| 42 | 1N4154 |
| 52 | 1N4154 |
| 58 | 1N4154 |
| Transistor 32 | 2N3858A |
| PUT 44 | 2N6028 |

It should be understood that changes and modifications in the form, construction, arrangement and combination of various parts and elements shown herein may be made without departing from the nature and principle of my invention.

Having thus described my invention, what I claim and desire to secure by Letters Patent is recited in the following Claims:

1. A voltage following control device comprising a positive terminal, a negative terminal, a relay including a coil and a pair of normally open contacts, a transistor operatively connected to the positive terminal and the negative terminal in series with the relay coil and adapted for going into conduction when a battery is connected across the positive terminal and negative terminal, a voltage following circuit including a Zener diode and first, second and third resistors in series, an electronic switch including a first electrode and a second electrode and adapted for going into conduction when the voltage at the second electrode is more positive than the voltage at the first electrode with respect to the negative terminal, the first electrode being connected to the voltage following circuit between the first and second resistors through a fourth registor and also being connected to the negative terminal through a fifth resistor and the second electrode being connected to the voltage following circuit between the second and third resistor, biasing means operatively connected to the transistor and the electronic switch and adpated for biasing the transistor out of conduction when current flows through the electronic switch, time responsive means operatively connected to the voltage following circuit for increasing the voltage at the second electrode to a level which will place the electronic switch in conduction a predetermined period of time after the battery has become fully charged, whereby to stop the supply of charging current to the battery, and holding means for retaining conduction in the electronic switch while the battery remains charged and connected across the positive and negative terminal.

2. The device of claim 1 wherein the electronic switch is a PUT the first electrode is the gate of the SCR, the second electrode is the anode of the PUT, and the time responsive means includes a capacitor disposed between the second electrode and the negative terminal, and also includes a relatively large resistance disposed between the second electrode and the common connection of the Zener and the first resistor whereby to increase gradually the voltage at the second electrode to a value which exceeds the voltage at the first electrode once the battery has become fully charged.

* * * * *